(12) United States Patent
Sengoku et al.

(10) Patent No.: US 11,878,488 B2
(45) Date of Patent: Jan. 23, 2024

(54) HOT STAMPED COMPONENT

(71) Applicant: NIPPON STEEL CORPORATION, Tokyo (JP)

(72) Inventors: Akihiro Sengoku, Tokyo (JP); Kojiro Akiba, Tokyo (JP); Satoshi Kato, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/791,696

(22) PCT Filed: Mar. 23, 2020

(86) PCT No.: PCT/JP2020/012663
§ 371 (c)(1),
(2) Date: Jul. 8, 2022

(87) PCT Pub. No.: WO2021/191955
PCT Pub. Date: Sep. 30, 2021

(65) Prior Publication Data
US 2023/0041452 A1 Feb. 9, 2023

(51) Int. Cl.
*B32B 15/01* (2006.01)
*C22C 18/00* (2006.01)
(Continued)

(52) U.S. Cl.
CPC .......... *B32B 15/013* (2013.01); *B21D 22/022* (2013.01); *B21D 22/20* (2013.01); *B32B 15/011* (2013.01); *B32B 15/04* (2013.01); *B32B 15/043* (2013.01); *B32B 15/18* (2013.01); *C22C 18/00* (2013.01); *C23C 2/04* (2013.01); *C23C 2/06* (2013.01); *C23C 2/26* (2013.01); *C23C 2/285* (2013.01); *C23C 2/30* (2013.01);
(Continued)

(58) Field of Classification Search
CPC .... C23C 2/06; C23C 2/30; C23C 2/04; C23C 2/26; C23C 2/285; C23C 28/025; C23C 28/3225; C23C 28/023; C23C 28/321; C23C 30/005; B32B 15/013; B32B 15/011; B32B 15/04; B32B 15/043; B32B 15/18; B21D 22/022; B21D 22/20; Y10T 428/12799; Y10T 428/12958; Y10T 428/12972; C25D 5/36; C22C 18/00
See application file for complete search history.

(56) References Cited

U.S. PATENT DOCUMENTS

2023/0023145 A1* 1/2023 Sengoku ............... B32B 15/011

FOREIGN PATENT DOCUMENTS

EP 1 439 240 A1 7/2004
JP 3582511 B2 10/2004
(Continued)

*Primary Examiner* — Michael E. La Villa
(74) *Attorney, Agent, or Firm* — Birch, Stewart, Kolasch & Birch, LLP (57) ABSTRACT

A hot stamped component, includes: a base material; and a Zn-based plating layer provided in contact with the base material as an upper layer of the base material and containing Zn and Ni. A region of the Zn-based plating layer on a base material side is a Fe—Zn solid solution containing Ni, and two or more twins exist in 10 crystal grains of the Fe—Zn solid solution containing Ni adjacent to an interface between the base material and the Zn-based plating layer.

3 Claims, 2 Drawing Sheets

(51) Int. Cl.
*C23C 28/00* (2006.01)
*B21D 22/20* (2006.01)
*C25D 5/36* (2006.01)
*C23C 2/06* (2006.01)
*C23C 30/00* (2006.01)
*B21D 22/02* (2006.01)
*B32B 15/18* (2006.01)
*B32B 15/04* (2006.01)
*C23C 28/02* (2006.01)
*C23C 2/30* (2006.01)
*C23C 2/28* (2006.01)
*C23C 2/04* (2006.01)
*C23C 2/26* (2006.01)

(52) U.S. Cl.
CPC .......... *C23C 28/023* (2013.01); *C23C 28/025* (2013.01); *C23C 28/321* (2013.01); *C23C 28/3225* (2013.01); *C23C 30/00* (2013.01); *C23C 30/005* (2013.01); *C25D 5/36* (2013.01); *Y10T 428/12799* (2015.01); *Y10T 428/12958* (2015.01); *Y10T 428/12972* (2015.01)

(56) References Cited

FOREIGN PATENT DOCUMENTS

| | | |
|---|---|---|
| JP | 4072129 B2 | 4/2008 |
| JP | 6135261 B2 | 5/2017 |

\* cited by examiner

HOT STAMPED COMPONENT

TECHNICAL FIELD

The present invention relates to a hot stamped component.

BACKGROUND ART

In the field of automobile components, there is an increasing need for higher strength in order to improve fuel efficiency and collision safety and the application of a hot stamping technique is expanding as a solution. A hot stamping is a technology of performing press forming and quenching at the same time using a pressing tool; a blank to be hot stamped is heated to a temperature ($Ac_3$ point) or higher at which an austenite single-phase region is obtained (for example, heated to about 900° C.). It is thus possible to produce a hot stamped product having excellent shape control and high strength.

When a hot stamping technique is applied to a non-plated steel sheet, scale is generated by heating in the hot stamping. For this reason, removing the scale is required through shot blasting or the like after hot stamping. However, as described in Patent document 1, if a plated steel sheet is used, scale generation can be prevented. Thus, a scale removal step can be omitted.

Furthermore, if a Zn-based plated steel sheet is used, a Zn component remains on a surface layer of a steel sheet after hot stamping. Thus, the effect of improving corrosion resistance can also be obtained in contrast with a hot stamping material formed of a non-plated steel sheet. For this reason, the application of Zn-based plated steel sheets for hot stamping is expanding.

CITATION LIST

Patent Documents

[Patent Document 1]
  Japanese Patent No. 3582511
[Patent Document 2]
  Japanese Patent No. 6135261
[Patent Document 3]
  Japanese Patent No. 4072129

Precautions at the time of utilizing a Zn-based plated steel sheet for hot stamping include the fact that liquid phase Zn is formed during heating. This is because a heating temperature is higher than a melting point of the plating. If this liquid phase Zn is formed and pressed (hot stamped), at a location to which tensile stress is applied, the liquid phase Zn flows into the grain boundaries of steel, thereby causing cracking. This phenomenon is called liquid metal embrittlement (LME) cracking. There is a concern that the strength of parts and fatigue characteristics will decrease due to the occurrence of this LME cracking.

Patent Document 2 describes a method of causing Zn in the plating and Fe in steel to be appropriately inter-diffused by appropriately controlling hot stamp heating conditions and removing liquid phase Zn during pressing by controlling a plating layer to have a single-phase structure of a Fe—Zn solid solution in which Zn is solid-dissolved (completely solid-dissolved). The method of Patent Document 2 is a method of utilizing the fact that a melting point of the Fe—Zn solid solution is higher than a heating temperature (about 900° C.) at the time of hot stamping and liquid phase Zn does not exist during heating by making a complete solid solution. Thus, it is possible to prevent LME cracking.

Also, Patent Document 3 describes a technique of improving corrosion resistance and paint adhesion by making the vicinity of a ground iron interface have an alloy layer formed of a Zn—Fe alloy containing 50 to 80 mass % of Fe which is inevitably formed by starting press forming of hot stamping at a temperature of a solidifying point of the liquid phase Zn or lower, for example, 780° C. or lower and distributing a Fe—Zn alloy layer containing 50 to 80 mass % of Fe and having a spherical shape in an island shape in the other surface layer portion using a Zn—Fe alloy layer containing 10 to 30 mass % of Fe (Γ phase) as a matrix. Since the liquid phase Zn does not exist at the time of press forming in the method of Patent Document 3, it is possible to prevent LME cracking.

However, problems other than LME cracking may occur in association with hot stamping of Zn-plated steel sheets. A paint is likely to peel off at a place on a hot stamped article which has been impacted by stones or the like on a road while the hot stamped article is being used. For this reason, better adhesion of a plating layer than that of the hot stamped components described in Patent Documents 1 to 3 is required.

SUMMARY OF THE INVENTION

Problems to be Solved by the Invention

The present invention was made in view of the above problems, and an object of the present invention is to provide a hot stamped component having excellent LME cracking resistance and excellent plating adhesion.

Means for Solving the Problem

As a result of studies by the present inventors, it was found that plating adhesion can be improved by providing a base material and a Zn-based plating layer provided as a layer above the base material and causing a predetermined number or more of intragranular twins to exist in crystal grains of a Fe—Zn solid solution containing Ni existing at an interface between the Zn-based plating layer and the base material.

The present invention has been further studied on the basis of the above findings and the gist of the present invention is as follows.

(1) A hot stamped component according to an aspect of the present invention includes: a base material; and a Zn-based plating layer provided in contact with the base material as a layer above the base material and containing Zn and Ni, wherein a region of the Zn-based plating layer on a base material side is a Fe—Zn solid solution containing Ni, and two or more twins exist in 10 crystal grains of the Fe—Zn solid solution containing Ni adjacent to an interface between the base material and the Zn-based plating layer.

(2) In the hot stamped component set forth in the above (1), the Zn-based plating layer may have a single-phase structure of the Fe—Zn solid solution containing Ni.

(3) In the hot stamped component set forth in the above (1), a surface layer side of the Zn-based plating layer may have a single-phase structure of a Zn—Fe—Ni alloy or a two-phase structure of a Zn—Fe—Ni alloy and a Fe—Zn solid solution containing Ni and the Zn-based plating layer excluding the surface layer side may have a single-phase structure of a Fe—Zn solid solution containing Ni.

(4) In the hot stamped component set forth in any one of the above (1) to (3), a Zn content of the Zn-based plating layer may be, in terms of mass %, 20% or more.

Effects of the Invention

According to the above aspects of the present invention, it is possible to provide a hot stamped component having excellent LME cracking resistance and excellent plating adhesion.

EMBODIMENTS FOR IMPLEMENTING THE INVENTION

As a result of studies by the present inventors, it was found that, when cracks (cracks in a Zn-based plating layer) occur in a Fe—Zn solid solution containing Ni adjacent to an interface between a base material and a Zn-based plating layer containing Zn and Ni, the adhesion of the plating decreases.

The cracks in the Zn-based plating layer will be described. The cracks in the Zn-based plating layer are crevices generated on the surface layer side of the Zn-based plated hot stamped component. Unlike LME cracks, the cracks in the Zn-based plating layer do not break the base material.

It is thought that the cracks in the Zn-based plating layer are formed in the Fe—Zn solid solution containing Ni or the like adjacent to the interface between the base material and the Zn-based plating layer. It is thought that the cracks in the Zn-based plating layer are formed due to a difference in the amount of heat shrinkage between the base material and the Fe—Zn solid solution containing Ni in a region of the Zn-based plating layer on the base material side. Hereinafter, a specific description will be provided.

Comparing the amount of heat shrinkage between Fe of the base material and Zn of the Zn-based plating layer, the amount of heat shrinkage of Zn in the Zn-based plating layer is larger than that of Fe in the base material. For this reason, when cooled from a high-temperature region to a low temperature region, Zn has a larger amount of heat shrinkage than that of Fe. Furthermore, when the base material is rapidly cooled during quenching, as in hot stamping, the base material expands due to austenite being transformed into martensite. In addition to the difference in heat shrinkage due to the chemical composition of the base material and the Zn-based plating layer described above, the difference in heat shrinkage between the Zn-based plating layer and the base material increases further due to the transformation expansion of this base material. It is thought that such a difference in heat shrinkage causes a force to be applied to the Fe—Zn solid solution containing Ni on the base material side of the Zn-based plating layer to form cracks. Comparing the amount of heat shrinkage between Fe in the base material and Ni in the Zn-based plating layer, the difference is small. Thus, an influence of Zn in the Zn-based plating layer is significant in the formation of the above cracks.

As a result of further studies by the present inventors, it was found that, when intragranular twins are formed in the crystal grains of the Fe—Zn solid solution containing Ni adjacent to the interface between the base material and the Zn-based plating layer, cracking occurring in the Zn-based plating layer could be reduced and the plating adhesion could be improved. It is thought that the strain and tensile stress applied to the Fe—Zn solid solution containing Ni due to the difference in the amount of heat shrinkage between the base material and the Zn-based plating layer can be relieved by the intragranular twins of the Fe—Zn solid solution containing Ni and the formation of cracks be prevented.

As a result of further studies by the present inventors, it was found that, when the production conditions are controlled, intragranular twins can be efficiently formed in the crystal grains of a Fe—Zn solid solution containing Ni adjacent to the interface between the base material and the Zn-based plating layer by coarsening the crystal grains on the surface layer of the base material before hot stamping and forming a Mn-deficient region at the grain boundaries. Since the Mn-deficient region has a high martensitic transformation start temperature (Ms point), martensitic transformation occurs from the Mn-deficient region in a cooling step during hot stamping. For this reason, it is thought that, since there is a difference in plastic strain between the untransformed granules in the base material and the Mn-deficient region, intragranular twins are likely to be formed in the Fe—Zn solid solution containing Ni located in the layer above the base material.

In the hot stamped component according to the embodiment, the constitution of the hot stamped component is determined on the basis of the above findings. In the description below, a numerical range represented by "to" means a range including numerical values before and after "to" as a lower limit value and an upper limit value. Numerical values indicated by the expressions "less than" and "greater than" are values not included in a numerical range. % with regard to a chemical composition always means mass %.

A hot stamped component 100 according to the embodiment will be described below with reference to the drawings.

First Embodiment

First, the hot stamped component 100 according to a first embodiment will be described with reference to FIG. 1.

Figure 1:
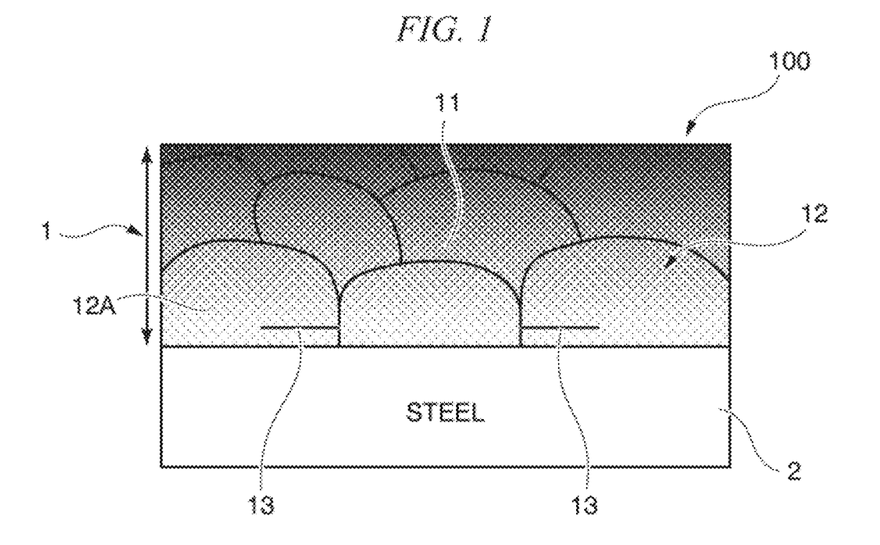
FIG. 1 is a schematic cross-sectional view of a hot stamped component according to an embodiment of the present invention.

As shown in FIG. 1, the hot stamped component 100 includes a Zn-based plating layer 1 containing Zn and Ni and a base material 2. The Zn-based plating layer 1 has a single-phase structure of a Fe—Zn solid solution containing Ni. Twins 13 exist in crystal grains 12A of a Fe—Zn solid solution 12 containing Ni adjacent to an interface between the base material 2 and the Zn-based plating layer 1 with a grain boundary 11 as a starting point. Each constitution will be described below.

(Base Material)

Steel as the base material 2 will be described. It is not necessary to particularly limit a chemical composition of the steel base material 2. Examples of the chemical composition of the base material of the steel sheet for an automobile may include, in terms of mass %, C: 0.05% to 0.40%, Si: 0.50% or less, Mn: 0.50% to 2.50%, P: 0.030% or less, S: 0.015% or less, Al: 0.100% or less, N: 0.010% or less, Cu: 0% to 1.00%, Ni: 0% to 1.00%, Cr: 0% to 0.50%, Mo: 0% to 0.50%, Nb: 0% to 0.10%, V: 0% to 0.10%, Ti: 0 to 0.10%, B: 0% to 0.0050%, Ca: 0% to 0.0100%, REM: 0% to 0.0100%, and the balance being iron and impurities. The chemical composition of these elements will be described below.

"C: 0.05% to 0.40%"

Carbon (C) is an element which enhances the strength of the hot stamped component which has been subjected to hot stamping. If the C content in the base material 2 is too low, the above effect cannot be obtained. For this reason, a lower limit of the C content in the base material 2 is preferably 0.05%. A preferable lower limit of the C content is 0.10%. On the other hand, if the C content in the base material 2 is too high, the toughness of the steel sheet is lowered. Therefore, an upper limit of the C content is preferably 0.40%. A preferred upper limit of the C content is 0.35%.

"Si: 0.50% or Less"

Silicon (Si) is an element inevitably contained in the base material 2. Furthermore, Si has the effect of deoxidizing the base material 2. However, if the Si content in the base material 2 is too high, Si in the base material 2 diffuses during heating in the hot stamping and an oxide is formed on a surface of the base material 2. This oxide inhibits phosphate treatment. Si further has a function of raising the $Ac_3$ point of the base material 2. In addition, when the $Ac_3$ point rises, there is a concern that the heating temperature at the time of hot stamping exceeds an evaporation temperature of Zn. Since the above problem becomes significant when the Si content of the base material 2 exceeds 0.50%, an upper limit of the Si content is preferably 0.50%. A more preferable upper limit of the Si content is 0.30%. A preferred lower limit of the Si content is 0.05%, depending on a required deoxidation level.

"Mn: 0.50% to 2.50%"

Manganese (Mn) is an element which enhances the hardenability of the base material 2 and enhances the strength of the hot stamped component 100. If the Mn content is too low, the effect cannot be obtained. In the case of obtaining this effect, it is preferable to set a lower limit of the Mn content of the base material 2 to 0.50%. A preferable lower limit of the Mn content of the base material 2 is 0.60%. On the other hand, if the Mn content is too high, the effect becomes saturated. Therefore, an upper limit of the Mn content of the base material 2 is preferably 2.50%. A preferable upper limit of the Mn content of the base material 2 is 2.40%.

"P: 0.030% or Less"

Phosphorus (P) is an impurity contained in the base material 2. P segregates at the grain boundaries of the base material 2, lowers the toughness of the steel, and lowers the delayed fracture resistance. Therefore, it is preferable that the P content of the base material 2 be as low as possible, because when the P content exceeds 0.03%, this effect becomes significant. For this reason, an upper limit of the P content in the base material 2 may be 0.030%. A lower limit of the P content is 0%.

"S: 0.015% or Less"

Sulfur (S) is an impurity contained in the base material 2. S forms a sulfide to reduce the toughness of steel and the delayed fracture resistance. Therefore, an upper limit of the S content is 0.015%. It is preferable that the S content be as low as possible. A lower limit of the S content is 0%.

"Al: 0.100% or Less"

Aluminum (Al) is an element effective for deoxidizing steel. In order to obtain this effect, a lower limit of the Al content of the base material 2 may be set to 0.010%. On the other hand, if the Al content is too high, the $Ac_3$ point of the steel sheet may rise and a required heating temperature at the time of hot stamping may exceed the evaporation temperature of the Zn-based plating layer 1 in some cases. Therefore, an upper limit of the Al content of the base material 2 is preferably 0.100%. A more preferable upper limit of the Al content of the base material 2 is 0.050%. A preferable lower limit of the Al content is 0.010%. The Al content in the present specification means the content of so-called total Al (T-Al).

"N: 0.010% or Less"

Nitrogen (N) is an impurity inevitably contained in the base material 2. N is an element which forms a nitride and lowers the toughness of the base material 2. When B is contained, N has the effect of binding to B and reducing the amount of solid solution B. The hardenability is lowered by reducing the amount of solid solution B. Therefore, it is preferable that the N content of the base material 2 be as low as possible. When the content of the base material 2 exceeds 0.010%, the effect becomes significant. Thus, an upper limit of the N content of the base material 2 may be 0.010%. It is not necessary to specifically identify a lower limit of the N content and a lower limit of the N content is 0%.

A chemical composition of the base material 2 of the embodiment may be, for example, a chemical composition which includes the above-mentioned elements with the balance being Fe and impurities. In the present specification, the impurities are impurities which are inevitably incorporated or intentionally added from ores as raw materials, scrap, the manufacturing environment, and the like when steel is industrially produced. In addition, examples of the impurities include elements which are allowed within a range in which the characteristics of the hot stamped component 100 according to the embodiment are not impaired.

The base material 2 constituting the hot stamped component 100 according to the embodiment includes one or more of elements selected from Cu, Ni, Cr, Mo, Nb, V, Ti, B, Ca, and REM as arbitrary elements instead of a part of Fe. When the following arbitrary elements are not contained, the content is 0%.

"Cu: 0% to 1.00%"

Cu is an element which can be dissolved in steel to increase the strength without debasing the toughness. However, if an excessive content is provided, micro cracks may be generated on the surface during rolling or the like in some cases. For this reason, the Cu content is preferably 1.00% or less or 0.60% or less, and more preferably 0.40% or less or 0.25% or less. In order to obtain the above sufficient effects, the Cu content is preferably 0.01% or more, and more preferably 0.05% or more.

"Ni: 0% to 1.00%"

Nickel (Ni) enhances the toughness of the base material 2. In addition, Ni minimizes the embrittlement caused by liquid phase Zn at the time of being heated through hot stamping. When these effects are obtained, a preferable lower limit of the Ni content of the base material 2 is 0.10%. However, if the Ni content of the base material 2 is too high, the above effect is saturated. Therefore, an upper limit of the Ni content is preferably 1.00%.

"Cr: 0% to 0.50%"

Chromium (Cr) is an element which enhances the hardenability of the base material. When this effect is obtained, a preferable lower limit of the Cr content of the base material 2 is 0.10%. However, if the Cr content of the base material 2 is too high, Cr carbides are formed and the carbides are difficult to dissolve during heating in the hot stamping. For this reason, it becomes difficult for the base material 2 to become austenitic and the hardenability is lowered. Therefore, an upper limit of the Cr content of the base material 2 is preferably 0.50%.

"Mo: 0% to 0.50%"

Molybdenum (Mo) is an element which enhances the hardenability of the base material 2. When this effect is obtained, a preferable lower limit of the Mo content of the base material 2 is 0.05%. However, if the Mo content of the base material 2 is too high, the above effect is saturated. Therefore, an upper limit of the Mo content of the base material 2 is preferably 0.50%.

[Nb: 0% to 0.10%, V: 0% to 0.10%, Ti: 0% to 0.10%]

Since Nb, V and Ti contribute to the improvement of the strength of the steel sheet due to the precipitation of carbides, one selected from these may be contained alone or in combination of two or more of these, if necessary. However, if any of the elements is excessively contained, a large amount of carbides are generated, which reduces the toughness of the steel sheet. For this reason, the contents of these elements may be 0.10% or less. If necessary, the contents of these elements may be 0.08% or less, 0.05% or less, or 0.03% or less, respectively.

"B: 0% to 0.0050%"

Boron (B) is an element which enhances the hardenability of steel and enhances the strength of the hot stamped component 100. When this effect is obtained, a preferable lower limit of the B content of the base material 2 is 0.0001%. However, if the B content of the base material 2 is too high, the effect is saturated. Therefore, an upper limit of the B content of the base material 2 is preferably 0.0050%.

[Ca: 0% to 0.0100% and REM: 0% to 0.0100%]

Ca and REM may be contained if necessary, because Ca and REM are elements which improve formability by controlling the morphology of non-metal inclusions which may become a starting point of fracture and cause deterioration of formability. However, if the contents of these elements are excessive, the effect is saturated and the raw material cost increases. For this reason, the Ca content and the REM content are preferably 0.0100% or less, respectively. If necessary, the contents of these elements may be 0.0060% or less, 0.0040% or less, or 0.0030% or less, respectively. REM is a general term for a total of 17 elements including Sc, Y and the lanthanoids, and the REM content means the total amount of the above elements.

The chemical composition of the base material 2 described above may be measured through a general analytical method. For example, inductively coupled plasma-atomic emission spectrometry (ICP-AES) may be used for measurement. C and S may be measured using a combustion-infrared absorption method and N may be measured using an inert gas melting-thermal conductivity method. A plating layer on a surface may be removed using mechanical grinding and then a chemical composition may be analyzed.

(Zn-Based Plating Layer)

The Zn-based plating layer 1 of the hot stamped component 100 according to the embodiment has the single-phase structure of the Fe—Zn solid solution containing Ni. A crystal structure of the Fe—Zn solid solution containing Ni is the same as that of a-Fe. The Fe—Zn solid solution containing Ni contains Fe and Zn solid-solution dissolved in Fe. When the Zn-based plating layer 1 has the single-phase structure of the Fe—Zn solid solution containing Ni, the LME crack resistance is improved. Furthermore, since the Zn-based plating layer 1 contains Ni, a melting point of the Zn-based plating layer 1 becomes high and the LME crack resistance is further improved. In the embodiment, the expression "containing Zn" means that the Zn content is 20.0% or more in terms of mass %. If necessary, a lower limit of the Zn content may be 22.0% or 25.0%. An upper limit of the Zn content is preferably 40.0%. If necessary, the upper limit of the Zn content may be 38.0% or 35.0%. Furthermore, in the embodiment, the expression "containing Ni" means that the Ni content is 1.0% or more. The Ni content may be 10 mass % or less. Although specifically identifying the contents of elements other than Zn and Ni is not required, it is preferable that the chemical composition of the Zn-based plating layer 1 include, for example, Fe: 60.0% to 80.0%, Na: 0% to 0.5%, K: 0% to 0.5%, S: 0% to 0.5%, and the balance: Zn and impurities. Here, Na, K, and S are optional components and lower limits thereof are 0. The chemical composition of the Zn-based plating layer 1 corresponds to the content of each element measured at a center of a thickness (center of a film thickness) of the Zn-based plating layer 1 through a GDS (glow discharge emission analysis).

The Zn-based plating layer 1 according to the embodiment has an Fe content in the range of 95.0% or less and an analysis position of the chemical composition is the center of the thickness of the Zn-based plating layer 1 (the center of the film thickness). A method of determining the chemical composition is as follows. The Fe content is measured from a surface of the hot stamped component 100 in a thickness direction of the hot stamped component 100 (that is, a direction from the surface of the hot stamped component 100 toward a center of a sheet thickness) through GDS and the range from the surface of the hot stamped component 100 until the Fe content exceeds 95.0% is specifically identified. After that, the content of each element at the center of a distance (that is, the center of the thickness of the Zn-based plating layer 1) of a range from the position in which the Fe content is 95.0% to the surface (this range is the Zn-based plating layer 1) is first determined and the analysis values are used in the chemical composition of the Zn-based plating layer 1. Here, since there is an oxide layer or the like on the further surface side of the hot stamped component 100, a high Zn content may be detected. Thus, the position in which the Zn content is 40.0% (when there are a plurality of positions, the position closest to the surface) is regarded as the surface position of the Zn-based plating layer 1.

In the hot stamped component 100 according to the embodiment, when 10 crystal grains 12A of the Fe—Zn solid solution 12 containing Ni adjacent to the interface between the Zn-based plating layer 1 and the base material 2 are observed at random, there are two or more twins 13. The presence of two or more twins 13 can sufficiently prevent cracks in the Zn-based plating layer.

Figure 2:
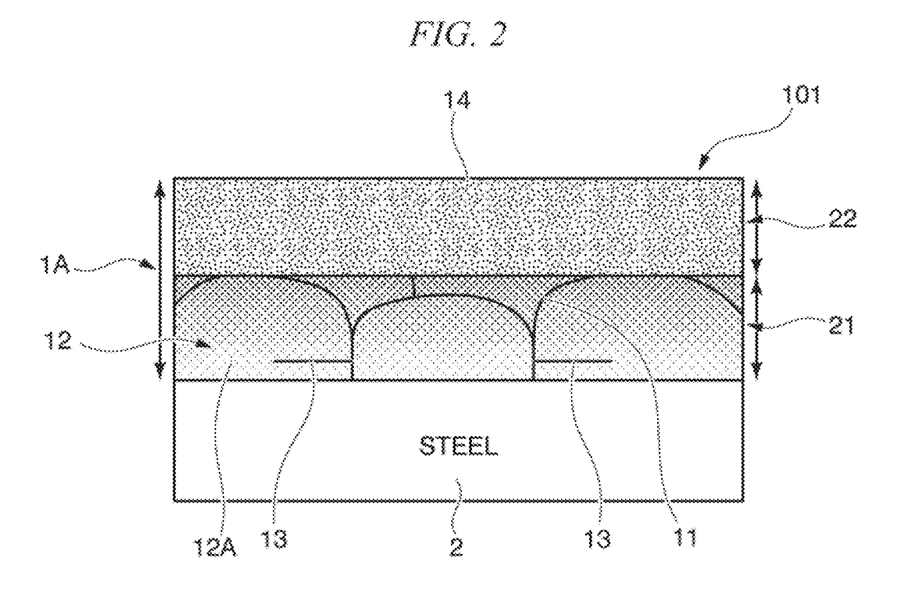
FIG. 2 is a schematic cross-sectional view of a hot stamped component according to another embodiment of the present invention.

The twins 13 have, as starting points, the grain boundaries of the crystal grain 12A of the Fe—Zn solid solution 12 containing Ni in many cases. For this reason, at the time of observing 10 crystal grains 12A of the Fe—Zn solid solution 12 containing Ni, there may be two or more twins 13 having, as starting points, the grain boundaries of the crystal grains 12A of the Fe—Zn solid solution 12 containing Ni. Furthermore, the twins 13 have an elongated structure as shown in FIG. 1 or 2. Lengths of the twins 12 are about 20 to 80% of diameters of the grain boundaries (here, diameters in an extension direction of the twins 12) of the crystal grains 12A of the Fe—Zn solid solution 12 containing Ni in many cases. For this reason, at the time of observing 10 crystal grains 12A of the Fe—Zn solid solution 12 containing Ni, the lengths of the twins are preferably 20 to 80% of the diameters of the grain boundaries of the crystal grains 12A of the Fe—Zn solid solution 12 containing Ni (here, the diameters in the extension direction of the twins 12).

The twins formed in the Fe—Zn solid solution containing Ni can be observed as follows. A thin section sample having a thickness of about 10 to 30 nm is prepared using a focused ion beam (FIB) processing device (for example, JIS-4000 manufactured by JEOL Ltd.) so that the Zn-based plating layer 1 can be observed from a cross section in a thickness direction. The crystal grains 12A of the Fe—Zn solid solution containing Ni adjacent to the interface between the Zn-based plating layer 1 and the base material 2 in the thin section sample are observed (magnification: 30,000 times) using a transmission electron microscope (TEM) (for example, JEM-ARM200F manufactured by JEOL Ltd.). In an observation image obtained through this observation, an aggregate of crystal grains in which 20.0% or more of Zn is detected using energy dispersive X-ray spectroscopy (EDS) analysis (energy dispersive X-ray analysis) is determined to be a Zn-based plating layer 1, a region in which Fe is detected at 95.0% or more using EDS analysis is determined to be the base material 2, and crystal grains observed in the Zn-based plating layer 1 adjacent to the base material 2 are determined to be the crystal grains 12A of the Fe—Zn solid solution containing Ni. It can be confirmed through the observation of a bright field image that twins are generated by obtaining an image of intragranular places observed in streaks in the crystal grains 12A of the Fe—Zn solid solution containing Ni adjacent to the interface between the Zn-based plating layer 1 and the base material 2 by magnifying by about 10 to 30 million times using a scanning transmission electron microscope (STEM) analysis method and observing the atomic arrangement.

In order to confirm that the Zn-based plating layer 1 has a single-phase structure of a Fe—Zn solid solution containing Ni, a method through SEM-BSE observation can be used. The details of the method will be described in a second embodiment which will be described later.

(Production Method)

A method for producing the hot stamped component 100 will be described below.

(Slab Heating Temperature: 1100 to 1300° C.)

First, a steel sheet to be used as a base material is prepared. For example, a molten steel having the above-described preferable range of chemical composition is produced. A slab is produced through a casting method such as continuous casting using the produced molten steel. Since a winding temperature after hot rolling is 850° C. or higher, the heating temperature of the slab is preferably 1100° C. or higher. There is no particular upper limit for heating the slab. In order to heat the slab above 1300° C., inputting a large amount of energy is required, which causes a significant increase in production cost. For this reason, the heating temperature of the slab is preferably 1300° C. or lower.

(Finish Rolling End Temperature: 900 to 950° C.)

After heating the slab, hot rolling is performed. If a finish rolling end temperature (rolling completion temperature) of hot rolling is less than 900° C., coarsening the crystal grains existing on the surface layer of the base material 2 is difficult. For this reason, the completion temperature of hot rolling is preferably 900° C. or higher. On the other hand, in order to make the completion temperature of hot rolling over 950° C., a device which heats the steel sheet is required in a process from the end of heating of the slab to the completion of hot rolling, which incurs a high cost. For this reason, the completion temperature of hot rolling is preferably 950° C. or lower.

(Winding Temperature: 850° C. or Higher)

Subsequently, the hot-rolled steel sheet which has been subjected to hot rolling is wound into a coil. A winding temperature of the hot-rolled steel sheet is preferably 850° C. or higher. When the winding temperature is less than 850° C., a Mn-deficient region may not be formed at the grain boundaries on the surface layer of the base material 2 which has not been subjected to hot stamping in some cases.

(Annealing After Winding: at 850° C. or Higher for 24 Hours or Longer)

It is preferable that the hot-rolled steel sheet which has been subjected to winding be annealed at 850° C. or higher for 24 hours or longer. By performing annealing at 850° C. or higher for 24 hours or longer, Mn existing on the surface layer of the base material 2 is transferred to the scale side. As a result, in the surface layer of the base material which has not been subjected to hot stamping, a Mn-deficient region is formed centering on crystal grain boundaries of the base material.

The hot-rolled steel sheet which has been subjected to winding and annealing is subjected to a known pickling treatment. After the pickling treatment, known cold rolling and annealing treatment are performed. The treatment may be performed through a known method according to the characteristics required for the applied member.

(Zn—Ni Plating)

When Zn—Ni plating is performed on the above-described cold-rolled steel sheet, a Zn—Ni plated layer is formed on a surface of a cold-rolled steel sheet and a steel sheet for hot stamping is obtained. Although a method of forming the Zn—Ni plating layer is not particularly limited, it is preferable that the Zn—Ni plating layer be formed through electroplating.

It is preferable that the weight of the Zn—Ni plating layer of the steel sheet for hot stamping be 20 g/m$^2$ or more and 120 g/m$^2$ or less. The weight of the Zn—Ni plating layer may not sufficiently prevent the oxidation (scale formation) of the base material 2 during hot stamp heating in some cases. For this reason, the plating weight is preferably 20 g/m$^2$ or more. A more preferable lower limit of the plating weight is 60 g/m$^2$. If the weight of the Zn—Ni plating layer is 120 g/m$^2$, the effect of preventing the oxidation of the base material 2 is saturated and the heating time becomes longer. For this reason, an upper limit of the weight of the Zn—Ni plating layer is preferably 120 g/m$^2$. A more preferable upper limit of the weight of the Zn—Ni plating layer is 80 g/m$^2$.

The weight of the Zn—Ni plated layer of the steel sheet for hot stamping can be obtained by immersing the steel sheet for hot stamping in a 5% HCl aqueous solution containing 0.02% of an inhibitor (Ibit 700A, Asahi Chemical Co., Ltd.) which prevents the dissolution of Fe in the cold-rolled steel sheet at room temperature for 10 minutes and dissolving all Zn—Ni plating layers and performing calculation from a weight change between before and after dissolution. Here, whether the dissolution of the Zn—Ni plating layer is completed is determined on the basis of the end of foaming due to the generation of hydrogen during dissolution.

Examples of the chemical composition of the Zn—Ni plated layer of the steel sheet for hot stamping include Ni: 10.0% to 20.0%, Na: 0% to 0.5%, K: 0% to 0.5%, S: 0% to 0.5%, and the balance: Zn and impurities. The Zn content in the balance is preferably 80% or more. If the Ni content is in the range of 10.0% to 20.0%, satisfactory LME crack resistance can be obtained. If the Zn content is 80% or more, the Zn content of the crystal grains 12 of the Fe—Zn solid solution containing Ni adjacent to the interface between the Zn-based plating layer 1 and the base material 2 is 20.0% or more, which is preferable.

(Hot Stamping Step)

Hot stamping is performed on the steel sheet for hot stamping including the above-described Zn—Ni plating layer. The details will be described below.

Since Zn has a larger coefficient of thermal expansion than that of Fe, the higher the Zn concentration in the Fe—Zn solid solution containing Ni located at the interface between the Zn-based plating layer 1 and the base material 2, the larger the difference in heat shrinkage from the base material 2 during cooling, in which the twins 13 are likely to be formed. However, since the Fe—Zn solid solution containing Ni is formed due to mutual diffusion of Zn in the Zn-based plating layer 1 and Fe in the base material 2, if the heating time becomes longer, the Zn concentration on the interface side between the Zn-based plating layer 1 and the base material 2 decreases. If the Zn concentration decreases, the difference in the amount of heat shrinkage between the Zn-based plating layer 1 and the base material 2 decreases. Thus, the twins 13 are no longer formed.

For this reason, in order to form the twins 13, in the hot stamping step, the steel sheet for hot stamping is heated so that a "Fe—Zn solid solution containing Ni parameter P" defined by the following Expression (1) satisfies 3.0≤P≤9.0:

$$P=[(T-782)\times\{(t_2-t_1)/2+(t-t_2)\}]/W^2 \quad (1).$$

Here, T indicates a furnace temperature set temperature (heating temperature) (° C.), t indicates a time (heating time) (second) from loading a steel sheet into a heating furnace to unloading the steel sheet, $t_1$ indicates a time (second) when the temperature of the steel sheet reaches 782° C., $t_2$ indicates a time when a heating temperature reaches the heating temperature (T)−10° C. (T−10° C. arrival time) (second), and W indicates the plating weight (g/m$^2$).

When a P value is less than 3.0, the liquid phase Zn remains in the Zn-based plating layer 1 and thus LME cracking is likely to occur when the press forming temperature is high in some cases. Therefore, the P value is set to 3.0 or more. A more preferable P value is 3.2 or more, and even more preferably 3.5 or more.

When the P value exceeds 9.0, excessive mutual diffusion between Zn in the Zn-based plating layer 1 and Fe in the base material 2 proceeds and the Zn concentration in the Zn-based plating layer 1 decreases in the region on the base material 2 side. For this reason, in a cooling process, the tensile stress due to the difference in thermal expansion between the Zn-based plating layer 1 and the base material 2 decreases and forming the twins 13 becomes difficult. For this reason, the P value is 9.0 or less. A more preferable P value is 8.8 or less, and even more preferably 8.5 or less.

If the heating temperature T is less than Ac$_3$, hardenability cannot be achieved. For this reason, it is preferable that the heating temperature be the Ac3 point or higher. When the heating temperature exceeds 950° C., excessive surface oxidation (formation of Zn oxide) of the hot stamped component 100 proceeds. For this reason, the heating temperature T is preferably 950° C. or lower. The Ac3 point (° C.) is expressed by the following Expression (2):

$$Ac_3=912-230.5\times C+31.6\times Si-20.4\times Mn-14.8\times Cr-18.1\times Ni+16.8\times Mo-39.8\times Cu \quad (2).$$

Element symbols in the above expression are the contents of the elements in terms of mass %, and where an element symbol is not included, this means that the content of this element is 0.

Through this heating, the Zn-based plating layer 1 has a single-phase structure of the Fe—Zn solid solution containing Ni due to Fe diffused from the base material and Zn during plating.

In hot stamping, a steel sheet for hot stamping is usually pressed using a pressing tool having a cooling medium (for example, water) circulating therein. When pressing the steel sheet for hot stamping, the steel sheet for hot stamping is quenched using the heat removed from the pressing tool. Through the above steps, the hot stamped component 100 is produced. A Mn-deficient region is formed at the grain boundaries of the base material of the steel sheet for hot stamping. Since this Mn-deficient region has a high martensitic transformation start temperature (Ms point), martensitic transformation occurs from the Mn-deficient region in this quenching. For this reason, due to the difference in plastic strain between the untransformed intragranules in the base material and the Mn-deficient region, twins are likely to be formed in the Fe—Zn solid solution containing Ni located in the upper layer of the base material.

The temperature at which the steel sheet for hot stamping is started to be pressed (quenching start temperature) is not particularly limited as long as it is equal to or higher than the temperature at which the steel sheet is quenched.

If an average cooling rate from the quenching start temperature to 450° C. is slower than 20° C./s, sufficient strength cannot be obtained. For this reason, the average cooling rate from the quenching start temperature to 450° C. is 20° C./s or higher.

Also, when the average cooling rate from 450° C. to 200° C. is slower than 15° C./s, the Fe—Zn solid solution containing Ni is not subjected to sudden stress in a short time, and twins 13 cannot be formed. For this reason, the average cooling rate from 450° C. to 200° C. is 15° C./s or higher.

Second Embodiment

A hot stamped component 101 in a second embodiment according to the present invention will be described below with reference to FIG. 2. Constituent elements in the second embodiment that are the same as those of the first embodiment will be denoted by the same reference numerals, description thereof will be omitted, and only the differences will be described.

In the embodiment, the expression "containing Zn" means that the Zn content is, in terms of mass %, 30.0% or more. If necessary, a lower limit of the Zn content may be 32.0% or 35.0%. In the embodiment, the expression "containing Ni" means that the Ni content is 1.0% or more. The Ni content may be 15 mass % or less. An upper limit of the Zn content is preferably 80.0%. If necessary, the upper limit of the Zn content may be 78.0% or 75.0%. Although specifically identifying the contents of elements other than Zn and Ni is not required, examples of the chemical composition of the Zn-based plating layer 1A (here, Zn and Ni are excluded) include, in terms of mass %, preferably Fe: 20.0% to 70.0%, Na: 0% to 0.5%, K: 0% to 0.5%, S: 0% to 0.5%, and the balance: impurity. Here, Na, K, and S are arbitrary components and lower limits thereof are 0.

The Zn-based plating layer 1A according to the embodiment has the Fe content in the range of 95.0% or less and an analysis position of the chemical composition is a center of a thickness of the Zn-based plating layer 1A (a center of a film thickness). A method of analyzing the chemical composition is as follows. The Fe content is measured from a surface of the hot stamped component 100 in the thickness direction (that is, the direction from the surface of the hot stamped component 100 toward the center of a sheet thickness) of the hot stamped component 100 through a GDS (glow discharge emission analysis) and the range from the surface of the hot stamped component 100 to the Fe content exceeding 95.0% is specifically identified. After that, the content of each element at a center of a distance (that is, the center of the thickness of the Zn-based plating layer 1) in the range from a position in which the Fe content is 95.0% to the surface (this range is the Zn-based plating layer 1) is first analyzed and the analyzed value is used as the chemical composition of the Zn-based plating layer 1. Here, since there is an oxide layer or the like on the further surface side of the hot stamped component 100, the Zn content may be detected to be high. Thus, the position in which the Zn content is 80.0% (when there are a plurality of positions, the position closest to the surface) is regarded as a surface position of the Zn-based plating layer 1A.

Figure 3:
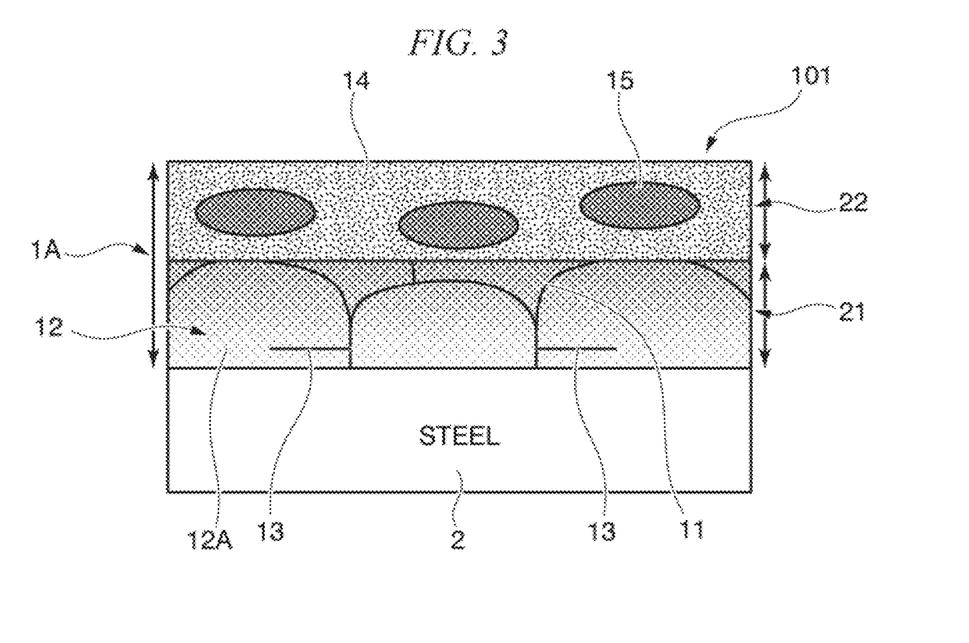
FIG. 3 is a schematic cross-sectional view of a hot stamped component according to another embodiment of the present invention.

As shown in FIG. 2, the hot stamped component 101 includes the Zn-based plating layer 1A and the base material 2. The Zn-based plating layer 1A includes a lower layer 21 and an upper layer 22. The upper layer 22 of the Zn-based plating layer 1A on the surface layer side has any one of 1) a single-phase structure of a Zn—Fe—Ni alloy 14 as shown in FIG. 2 or 2) a two-phase structure in which the Fe—Zn solid solution 15 containing Ni in the Zn—Fe—Ni alloy 14 is distributed in an island shape as shown in FIG. 3. The lower layer 21 which is a region of the Zn-based plating layer 1A on the base material side is a single-phase structure of the Fe—Zn solid solution containing Ni. Twins 13 exist in the crystal grains 12A of the Fe—Zn solid solution 12 containing Ni adjacent to the interface between the base material 2 and the Zn-based plating layer 1A having the grain boundaries 11 as starting points. Each constitution will be described below.

(Zn-Based Plating Layer 1A)

The Zn-based plating layer 1A includes the lower layer 21 and the upper layer 22.

The upper layer 22 of the Zn-based plating layer 1A on the surface layer side has any one of 1) the single-layer structure of Zn—Fe—Ni alloy 14 (refer to FIG. 2) or 2) the two-phase structure (refer to FIG. 3) of the Zn—Fe—Ni alloy 14 and the Fe—Zn solid solution 15 containing Ni. The Zn—Fe—Ni alloy 14 has the total of the analytical values of Fe and Ni which is 10 mass % or more and 30 mass % or less, the analysis value of Zn which is 70% by mass or more, and the balance which is composed of impurities through an energy dispersive X-ray spectroscopy (EDS) analysis. Corrosion resistance after coating is improved by the upper layer 22 which is a region on the surface layer side have the single-layer structure of the Zn—Fe—Ni alloy 14 or the two-phase structure of the Zn—Fe—Ni alloy 14 and the Fe—Zn solid solution 15 containing Ni.

The lower layer 21 which is a region of the Zn-based plating layer 1A on the base material side is a single-phase structure of the Fe—Zn solid solution 12 containing Ni. In the hot stamped component 101 according to this embodiment, when 10 crystal grains 12A of the Fe—Zn solid solution 12 containing Ni adjacent to the interface between the Zn-based plating layer 1A and the base material 2 are randomly observed, there are two or more twins 13. The presence of two or more twins 13 can sufficiently prevent cracks in the Zn-based plating layer 1A. The twins 13 have, as starting points, the grain boundaries of the crystal grain 12A of the Fe—Zn solid solution 12 containing Ni in many cases. For this reason, at the time of observing 10 crystal grains 12A of the Fe—Zn solid solution 12 containing Ni, it is also possible that there are two or more twins 13 having, as starting points, the grain boundaries of the crystal grains 12A of the Fe—Zn solid solution 12 containing Ni. Furthermore, the twins 13 have an elongated structure as shown in FIG. 1 or 2. Lengths of the twins 12 are about 20% to 80% of the diameter of the grain boundaries (here, the diameter in an extension direction of the twins 12) of the crystal grains 12A of the Fe—Zn solid solution 12 containing Ni in many cases. For this reason, at the time of observing 10 crystal grains 12A of the Fe—Zn solid solution 12 containing Ni, the lengths of the twins are preferably 20% to 80% of the diameter of the grain boundaries of the crystal grains 12A of the Fe—Zn solid solution 12 containing Ni (here, the diameter in an extension direction of the twins 12).

Figure 4:
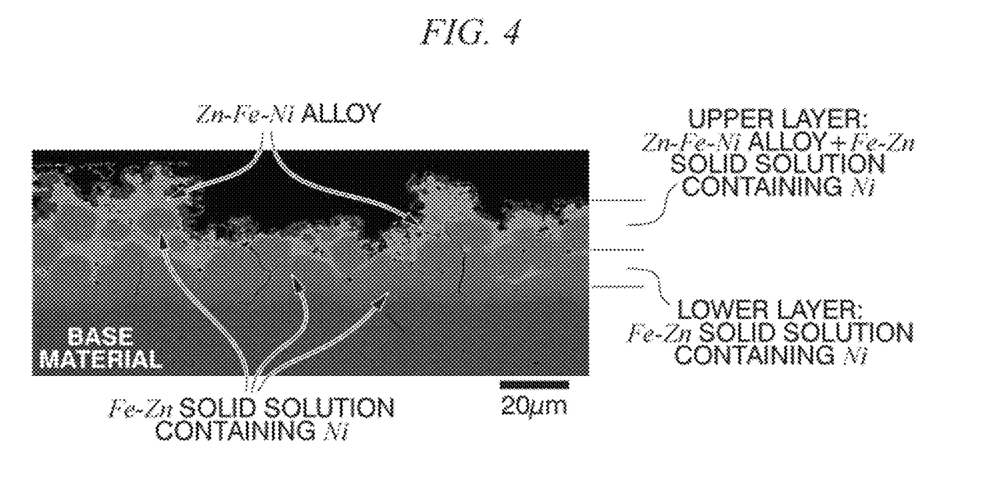
FIG. 4 is an example of a cross-sectional SEM image of a hot stamped component according to another embodiment of the present invention.

The Zn—Fe—Ni alloy 14 and the Fe—Zn solid solutions 12 and 15 containing Ni can be observed as follows. A sample cut to have a size of about 20 mm square is embedded in a resin so that the Zn-based plating layer 1A can be observed from a cross section in the thickness direction, and then finishing is performed to have a mirror surface through mechanical polishing. This resin-embedded sample is observed at a magnification of 2000 times with a backscattered electron (BSE) image using a scanning electron microscope (SEM). In this SEM-BSE observation, an element having a large atomic weight is observed to have a bright (white) contrast, and thus the Zn—Fe—Ni alloy and the Fe—Zn solid solution containing Ni can be identified due to this difference in contrast. To be specific, the Zn—Fe—Ni alloy containing a large amount of Zn having an atomic weight than larger that of Fe is observed in white and the Fe—Zn solid solution containing Ni is observed in black. The plating layer of the embodiment has a two-layer structure, the lower layer 21 in contact with the base material 2 has a single-phase structure of the Fe—Zn solid solution containing Ni, and the upper layer 22 has a single-phase structure of the Zn—Fe—Ni alloy or a two-phase structure of the Zn—Fe—Ni alloy 14 and the Fe—Zn solid solution 15 containing Ni. In the case of FIG. 3, the upper layer 22 has a two-phase structure of the Zn—Fe—Ni alloy and the Fe—Zn solid solution containing Ni. In the first embodiment described above, at the time of confirming that the Zn-based plating layer 1 is the Fe—Zn solid solution containing Ni, this SEM-BSE image method can be used. Although there is a clear interface between the upper layer 22 and the lower layer 21 in FIGS. 2 and 3, there are many cases in which there is no clear interface as in FIG. 4. However, all of the interfaces of the Zn-based plating layer 1A on the base material side basically include the Fe—Zn solid solution 12 containing Ni without the Zn—Fe—Ni alloy 14. For this reason, in the embodiment, even if there is no clear interface between the upper layer 22 and the lower layer 21 as shown in FIG. 4, it is regarded as a two-phase structure. There is no clear interface between the upper layer 22 and the lower layer 21 in some cases and it is not necessary to determine a thickness ratio of the upper layer 22 and the lower layer 21.

(Production Method)

A method of producing the hot stamped component 101 according to the second embodiment will be described below. The method of producing the hot stamped component 101 is the same as that for the hot stamped component 100 until the steel sheet for hot stamping is produced. That is to say, the hot stamping process is different between the method of producing the hot stamped component 101 and the method of producing the hot stamped component 100 according to the first embodiment.

(Hot Stamping Step)

In the second embodiment, in order to form the upper layer 22 of the Zn—Fe—Ni alloy, the steel sheet for hot stamping is heated so that the "Fe—Zn solid solution containing Ni parameter P" defined by the above Expression (1) satisfies $0.5 \leq P \leq 2.5$.

When the P value is less than 0.5, the lower layer 21 made of the Fe—Zn solid solution containing Ni may not be covered in some cases. For this reason, the P value is 0.5 or more.

When the P value exceeds 2.5, a proportion of the Fe—Zn solid solution containing Ni in the Zn-based plating layer 1 increases and the corrosion resistance after coating decreases. For this reason, the P value is 2.5 or less.

In the first embodiment, at the end of heating, the plating layer has a single-layer structure of a Fe—Zn solid solution containing Ni, that is, a state in which the liquid phase Zn does not exist. On the other hand, in the second embodiment, Zn in the liquid phase exists at the end of heating and this phase changes to a Zn—Fe—Ni alloy after hot stamping. In the second embodiment, it is necessary to hot-stamp the liquid phase Zn after it solidifies with cooling and only the temperature at which the pressing of the steel sheet for hot stamping is started (quenching start temperature) is different.

To be specific, the temperature at which the pressing of the steel sheet for hot stamping is started (quenching start temperature) is set to be equal to or lower than the temperature at which the liquid phase Zn contained in the Zn plating layer finishes solidifying. To be specific, the temperature is 800° C. or lower, preferably 780° C. or lower, and more preferably 750° C. or lower.

Although there is a difference in the quenching start temperature, as in the first embodiment, twins are formed in the Fe—Zn solid solution containing Ni adjacent to the interface between the base material 2 and the lower layer 21 due to the difference in plastic strain between the untransformed grains in the base material and the Mn-deficient region. Furthermore, the liquid phase Zn which exists when taken out from the heating furnace becomes the Zn—Fe—Ni alloy 14 (Zn—Fe—Ni alloy 14 in the upper layer 22) before the start of quenching.

As in the first embodiment, an average cooling rate from the quenching start temperature to 450° C. is 20° C./s or higher. The average cooling rate from 450° C. to 200° C. is 15° C./s or higher.

When the temperature at which the pressing of the steel sheet for hot stamping is started (quenching start temperature) is set to a lower temperature, the upper layer 22 can have a single layer structure of the Zn—Fe—Ni alloy 14. For this reason, when the upper layer 22 is desired to have a single layer structure of the Zn—Fe—Ni alloy 14, for example, after obtaining in advance an upper limit temperature (or a maximum time from removal from a heating furnace to the start of quenching) in which the surface layer becomes a Zn—Fe—Ni alloy single layer through a preliminary test or the like, the quenching start, that is, the hot stamping process may be started from a temperature equal to or lower than the upper limit temperature (or a time longer than the maximum time). Similarly, when the upper layer 22 is desired to have a two-phase structure of the Zn—Fe—Ni alloy 14 and the Fe—Zn solid solution containing Ni, rapid cooling may be started, that is, hot stamping may be started from a temperature exceeding the upper limit temperature of the Zn—Fe—Ni alloy single layer.

EXAMPLES

Although examples of the present invention will be described below, the conditions in the examples are one condition example adopted for confirming the feasibility and effects of the present invention and the present invention is not limited to this one-condition example. The present invention can adopt various conditions as long as the gist of the present invention is not deviated and the object of the present invention is achieved.

A slab obtained by casting molten steel in which a chemical composition was a chemical composition of C: 0.20%, Si: 0.19%, Mn: 1.31%, P: 0.010%, S: 0.005%, Cu: 0.01%, Ni: 0.01%, Cr: 0.20%, Mo: 0.01%, Ti: 0.01%, B: 0.0002%, N: 0.002%, Ca: 0.0002%, REM: 0.0002%, Al: 0.020%, and the balance of iron and impurities ($Ac_3$: 842° C.) was heated under the conditions shown in Table 1 and subjected to hot rolling at the finish rolling end temperature shown in Table 1. After hot rolling, it was wound at the temperature shown in Table 1 and annealed after winding under the conditions shown in Table 1. The annealed steel sheet was pickled to obtain a hot-rolled steel sheet.

The above hot-rolled steel sheet was cold-rolled to the sheet thickness shown in Table 1 and then annealed and was subjected to Zn—Ni plating (electroplating) under the conditions shown in Table 1 to obtain a steel sheet for hot stamping.

The steel sheet for hot stamping obtained by the above method was hot-stamped under the conditions shown in Table 2 to obtain a hot stamped component. Table 2 shows the P value of each of the conditions.

(Weight of Zn—Ni Plating Layer)

The weight of the Zn—Ni plated layer of the steel sheet for hot stamping was measured as follows. After a sample (30 mm×30 mm) cut out from the steel sheet for hot stamping obtained as described above was covered with a masking tape on a surface opposite to an evaluation surface, all Zn—Ni plated layers were dissolved by being immersed in a 5% HCl aqueous solution containing 0.02% of an inhibitor (Ibit 700A, Asahi Chemical Co., Ltd.) which prevents the dissolution of Fe in a cold-rolled steel sheet at room temperature for 10 minutes and the plating weight was calculated from a change in weight before and after the dissolution. Whether the dissolution of all of the plated layers was completed was determined on the basis of the completion of foaming due to hydrogen generation during the dissolution. Table 1 shows the results obtained. The Ni content of the Zn—Ni plating layer was measured using an ICP emission spectrometer (manufactured by Shimadzu Corporation, model number: ICPS-8100). The results obtained are shown in Table 1.

(Chemical Composition of Zn-Based Plating Layer)

Through the above method, each component of the Zn-based plating layer of the hot stamped component was measured and obtained through GDS analysis. Table 3 shows the results of a Zn concentration (mass %), a Fe concentration (mass %), and a Ni concentration (mass %) at a center position (center position between the surface and the position in which the Fe content is 95.0%) of a thickness of the obtained Zn-based plating layer.

A method of evaluating LME crack resistance was as follows. Immediately after hot stamping, the sample was machined with a 90 degree V bending tool with a radius of curvature R=0.5 mm, a cross section of the hot stamped component at a distal end of the machined portion in the thickness direction was observed with a scanning electron microscope (SEM), and the presence or absence of LME cracks was investigated. In the SEM photographic image of the cross section (magnification 1000 times), when the LME cracking propagates not only to the Zn-based plating layer on the surface of the hot stamped component but also to the base material, the LME cracking was determined to have occurred and it was evaluated as "Bad". When the LME cracking stayed in the Zn-based plating layer and did not propagate to the base material, it was determined that the LME cracking did not occur and it was evaluated as "Good". Table 3 shows the results obtained.

An evaluation method of corrosion resistance after coating was performed as follows. A surface of the hot stamped component (sheet shape) was adjusted at room temperature for 20 seconds using a surface adjusting treatment agent (trade name: PREPALENE-X) manufactured by Nihon Parkerizing Co., Ltd. Subsequently, phosphate processing was performed using a zinc phosphate processing solution (trade name: Palbond 3020) manufactured by Nihon Parkerizing Co., Ltd. To be specific, the temperature of the treatment liquid was set to 43° C. and the hot stamped component was immersed in a processing liquid for 120 seconds. Thus, a phosphate conversion coating was formed on a surface of the steel.

For the hot stamped component after performing the above-mentioned phosphate processing, a cationic electrodeposition paint manufactured by Nippon Paint Holdings Co., Ltd. was electrodeposited (thickness: 15 μm) by energizing a slope with a voltage of 160 V and the coating was further performed by performing firing at a firing temperature of 170° C. for 20 minutes.

A cross-cut was made in the hot stamped component after electrodeposition paint to reach the steel sheet of the base material and a composite corrosion test (JASO M610 cycle) was performed. Corrosion resistance was evaluated using a coating swelling width, when the coating swelling width after 180 cycles of the combined corrosion test was less than 3 mm, it was evaluated as "Excellent", when it was 3 mm or more and 6 mm or less, it was evaluated as "Good", and when it was larger than 6 mm, it was evaluated as "Bad". Table 3 shows the results obtained.

The twins formed in the Fe—Zn solid solution containing Ni were observed as follows. A thin section sample having a thickness of about 10-30 nm was prepared so that the Zn-based plating layer of the hot stamped component described above can be observed from the cross section in the thickness direction using a focused ion beam (FIB) processing device (JIS-4000 manufactured by JEOL Ltd.). 10 crystal grains of the Fe—Zn solid solution containing Ni of the thin section sample adjacent to the interface between the Zn-based plating layer and the base material were randomly observed (magnification: 30,000 times) using a transmission electron microscope (TEM) (JEM-ARM200F manufactured by JEOL Ltd.). It was confirmed through the observation of the bright field image that the twins were obtained by magnifying places observed in streaks in the crystal grains of Fe—Zn solid solution containing Ni adjacent to the interface between the Zn-based plating layer and the base material about 10 to 30 million times using a scanning transmission electron microscope (STEM) analysis method and observing the atomic arrangement. 10 crystal grains of the Fe—Zn solid solution containing Ni adjacent to the interface between the Zn-based plating layer and the base material were observed, when the total number of twins confirmed in 10 crystal grains was two or more, it was determined as "Good" and when the total number of twins was less than 2, it was determined as "Bad". Table 3 shows the results obtained.

The presence or absence of the Zn—Fe—Ni alloy was determined as follows. A sample cut to a size of about 20 mm square was embedded in the resin so that the Zn-based plating layer could be observed from the cross section in the thickness direction, and then the surface was mirror-finished through mechanical polishing. This resin-embedded sample was observed at a magnification of 2000 times with a backscattered electron (BSE) image using a scanning electron microscope (SEM). A region observed in black (Fe—Zn solid solution containing Ni) and the Zn—Fe—Ni alloy in the region observed in white were observed. A case in which the Zn-based plating layer has only a single-phase structure of the Fe—Zn solid solution containing Ni was designated as A, a case in which the upper layer has a two-layer structure of the Zn—Fe—Ni alloy and the Fe—Zn solid solution containing Ni and the lower layer has a single phase structure of the Fe—Zn solid solution containing Ni was designated as B, and a case in which the upper layer has a single-phase structure of the Zn—Fe—Ni alloy and the lower layer has a single-phase structure of the Fe—Zn solid solution containing Ni was designated as C. Table 3 shows the results obtained.

The plating adhesion was evaluated as follows. An evaluation object cut out from a hot stamped component to 70 mm×150 mm was subjected to degreasing for automobiles, chemical conversion treatment (formation of chemical conversion coating), and 3-coat coating. The 3-coat coating was electrodeposition coating, intermediate coating, and top coating from the steel sheet side. Samples were cooled at −20° C. and hit with crushed stones (0.3 to 0.5 g) vertically projected with an air pressure of 2 kgf/cm$^2$.

10 stones were projected with the air pressure per sample. Chipping marks were observed and evaluated by the position of the peeling interface. Cases in which a peeling interface was above the Zn-based plating layer (Zn-based plating layer-chemical conversion film interface or electrodeposition paint-intermediate paint interface) were evaluated as "Good", and cases in which at least one interface peeling occurred between the Zn-based plating layer and the surface of the steel sheet were evaluated as "Bad". Table 3 shows the results obtained.

TABLE 1

| | Hot rolling conditions | | | | Plating conditions (before HS) | | |
| --- | --- | --- | --- | --- | --- | --- | --- |
| No. | Slab heating temperature [° C.] | Finish rolling end temperature [° C.] | Winding temperature [° C.] | Annealing after winding | Ni content in Zn—Ni plating layer [mass %] | [W] Plating weight [g/m$^2$] | Sheet thickness [mm] |
| Example 1 | 1220 | 940 | 875 | 850° C. x 24 h | 12.0 | 60 | 1.6 |
| Example 2 | 1180 | 928 | 855 | 850° C. x 24 h | 13.5 | 60 | 1.2 |
| Example 3 | 1200 | 945 | 882 | 850° C. x 24 h | 12.5 | 90 | 1.6 |
| Example 4 | 1250 | 935 | 868 | 850° C. x 24 h | 14.5 | 90 | 2.0 |
| Example 5 | 1220 | 940 | 875 | 850° C. x 24 h | 12.0 | 60 | 1.6 |
| Comparative Example 1 | 1150 | 878 | 712 | None | 12.5 | 45 | 1.2 |

TABLE 1-continued

| | Hot rolling conditions | | | | Plating conditions (before HS) | | |
|---|---|---|---|---|---|---|---|
| No. | Slab heating temperature [° C.] | Finish rolling end temperature [° C.] | Winding temperature [° C.] | Annealing after winding | Ni content in Zn—Ni plating layer [mass %] | [W] Plating weight [g/m$^2$] | Sheet thickness [mm] |
| Comparative Example 2 | 1150 | <u>862</u> | <u>708</u> | <u>None</u> | 13.5 | 60 | 1.6 |
| Comparative Example 3 | 1150 | 905 | 851 | <u>None</u> | 11.5 | 45 | 1.6 |
| Comparative Example 4 | 1250 | 935 | 868 | <u>None</u> | 14.5 | 90 | 2.0 |
| Comparative Example 5 | 1220 | 940 | 875 | 850° C. x 24 h | 12.0 | 60 | 1.6 |

Underlined portions indicate that it is outside the scope of the present invention.

TABLE 2

| | Hot stamp conditions | | | | | Measurement value | | |
|---|---|---|---|---|---|---|---|---|
| No. | [T] Heating temperature [° C.] | [t] Heating time [sec] | Quenching start temperature [° C.] | Cooling rate (quenching start temperature→450° C.) [° C./sec] | Cooling rate (450→200° C.) [° C./sec] | [t1] 782° C. arrival time [sec] | [t2] T-10° C. arrival time [sec] | [P] Fe—Zn solid solution parameter |
| Example 1 | 900 | 300 | 800 | 30 | 50 | 90 | 180 | 5.4 |
| Example 2 | 900 | 240 | 780 | 30 | 50 | 75 | 140 | 4.3 |
| Example 3 | 900 | 180 | 650 | 30 | 50 | 90 | 180 | 0.7 |
| Example 4 | 900 | 300 | 680 | 30 | 50 | 120 | 215 | 1.9 |
| Example 5 | 900 | 300 | 650 | 30 | 50 | 90 | 180 | 5.4 |
| Comparative Example 1 | 900 | 180 | 780 | 30 | 50 | 75 | 140 | 4.2 |
| Comparative Example 2 | 900 | 180 | 680 | 30 | 50 | 90 | 180 | 1.5 |
| Comparative Example 3 | 900 | 450 | 800 | 30 | 50 | 90 | 180 | <u>18.4</u> |
| Comparative Example 4 | 900 | 300 | <u>820</u> | 30 | 50 | 120 | 215 | 1.9 |
| Comparative Example 5 | 900 | 300 | 800 | 30 | <u>10</u> | 90 | 180 | 5.4 |

Underlined portions indicate that it is outside the scope of the present invention.

TABLE 3

| | Hot stamped component | | | | | | | |
|---|---|---|---|---|---|---|---|---|
| No. | Zn-based plating layer | Zn concentration in Zn plating layer [mass %] | Fe concentration in Zn plating layer [mass %] | Ni concentration in Zn plating layer [mass %] | Number of twins [number/10 crystal grains of Fe—Zn solid solution] | LME cracking resistance | Corrosion resistance after coating | Plating adhesion |
| Example 1 | A | 32.6 | 63.9 | 3.5 | 2 | Good | Good | Good |
| Example 2 | A | 33.4 | 62.1 | 4.5 | 3 | Good | Good | Good |
| Example 3 | C | 68.7 | 24.1 | 7.2 | 3 | Good | Excellent | Good |
| Example 4 | B | 46.4 | 47.1 | 6.5 | 2 | Good | Excellent | Good |
| Example 5 | A | 34.4 | 63.1 | 2.5 | 2 | Good | Good | Good |
| Comparative Example 1 | A | 31.1 | 65.8 | 3.1 | <u>0</u> | Good | Good | Bad |
| Comparative Example 2 | B | 51.4 | 42.8 | 5.8 | <u>1</u> | Good | Excellent | Bad |
| Comparative Example 3 | A | <u>18.7</u> | 78.9 | 2.4 | <u>0</u> | Good | Bad | Bad |
| Comparative Example 4 | B | 46.3 | 46.9 | 6.8 | <u>1</u> | Bad | Excellent | Bad |
| Comparative Example 5 | A | 31.4 | 65.2 | 3.4 | <u>0</u> | Good | Good | Bad |

Underlined portions indicate that it is outside the scope of the present invention.

As shown in Table 2, it was found that the hot stamped component of Examples 1 to 5 according to the present invention could obtain good plating adhesion. Examples 3 and 4 having the Zn—Fe—Ni alloy had better post-painting corrosion resistance than those of Examples 1, 2, and 5.

Since the number of twins was less than 2 in Comparative Examples 1 to 5, the inferior plating adhesion was provided.

INDUSTRIAL APPLICABILITY

According to the present invention, a hot stamped component having a Fe—Zn solid solution containing Ni in a Zn-based plating layer also has excellent plating adhesion. Thus, the present invention has high industrial applicability.

BRIEF DESCRIPTION OF THE REFERENCE SYMBOLS 1, 1A Zn-based plating layer
2 Base material
11 Grain boundary
12 Fe—Zn solid solution containing Ni
12A Crystal gain of Fe—Zn solid solution containing Ni
13 Twin
14 Zn—Fe—Ni alloy
15 Fe—Zn solid solution containing Ni
21 Lower layer
22 Upper layer
100, 101 Hot stamped component

The invention claimed is:

1. A hot stamped component, comprising:
a steel base material; and
a plating layer provided in contact with the steel base material as an upper layer of the steel base material and comprising 20% by mass or more Zn and 1.0% by mass or more Ni, each at a center position of a thickness of the plating layer wherein the center position is between the surface of the plating layer and a position in which a content of Fe is 95.0% by mass,
wherein a region of the plating layer on a steel base material side is a Fe—Zn solid solution comprising Ni, and
two or more twins exist in 10 crystal grains of the Fe—Zn solid solution adjacent to an interface between the steel base material and the plating layer.

2. The hot stamped component according to claim 1, wherein the plating layer has a single-phase structure of the Fe—Zn solid solution.

3. The hot stamped component according to claim 1, wherein a surface layer side of the plating layer has a single-phase structure of a Zn—Fe—Ni alloy or a two-phase structure of a Zn—Fe—Ni alloy and a Fe—Zn solid solution and the plating layer excluding the surface layer side is a single-phase structure of the Fe—Zn solid solution.

* * * * *